(12) United States Patent
Andrieux

(10) Patent No.: US 9,812,918 B2
(45) Date of Patent: Nov. 7, 2017

(54) ELECTRICAL CONNECTION ASSEMBLY FOR BRUSHLESS MOTOR AND SYSTEM COMPRISING SUCH AN ASSEMBLY

(71) Applicant: SONCEBOZ AUTOMOTIVE SA, Sonceboz (CH)

(72) Inventor: Gaël Andrieux, Evilard (CH)

(73) Assignee: Sonceboz Automotive SA, Sonceboz (CH)

( * ) Notice: Subject to any disclaimer, the term of this patent is extended or adjusted under 35 U.S.C. 154(b) by 412 days.

(21) Appl. No.: 14/431,124

(22) PCT Filed: Aug. 27, 2013

(86) PCT No.: PCT/FR2013/051971
§ 371 (c)(1),
(2) Date: Mar. 25, 2015

(87) PCT Pub. No.: WO2014/049218
PCT Pub. Date: Apr. 3, 2014

(65) Prior Publication Data
US 2015/0249375 A1    Sep. 3, 2015

(30) Foreign Application Priority Data

Sep. 26, 2012 (FR) .................................... 12 59035

(51) Int. Cl.
*H02K 1/04* (2006.01)
*H02K 3/50* (2006.01)
(Continued)

(52) U.S. Cl.
CPC ................. *H02K 3/50* (2013.01); *H02K 3/02* (2013.01); *H02K 3/522* (2013.01); *H02K 5/225* (2013.01);
(Continued)

(58) Field of Classification Search
CPC .......... H02K 15/12; H02K 5/225; H02K 5/08; H02K 2203/09; H02K 3/50; H02K 2203/12
(Continued)

(56) References Cited

U.S. PATENT DOCUMENTS 4,287,446 A    9/1981 Lill et al.
4,689,023 A    8/1987 Strong, III et al.
(Continued)

FOREIGN PATENT DOCUMENTS

JP    2000224801 A    8/2000
JP    2003294488 A    10/2003
WO    WO-03001647 A1    1/2003

*Primary Examiner* — Thanh Lam
(74) *Attorney, Agent, or Firm* — Harness, Dickey & Pierce, PLC

(57) ABSTRACT

The present disclosure relates to an electrical connection system and assembly for a brushless electromagnetic motor including a coiled stator assembly with P electric phases and X coils per phase, each coil exhibiting in proximity a body furnished with two connection slots, a first sub-assembly formed of W tracks cut in a conducting sheet, the tracks forming W coplanar output tracks, W being an integer number lying between P and P+1, each of the W tracks terminating in at least one end folded back perpendicularly to the plane of the tracks, the shape of the folded back end being complementary to the shape of the connection slot, the tracks being joined by an insulating plastic material.

14 Claims, 4 Drawing Sheets

(51) Int. Cl.
*H02K 29/08* (2006.01)
*H02K 3/52* (2006.01)
*H02K 5/22* (2006.01)
*H02K 3/02* (2006.01)

(52) U.S. Cl.
CPC ......... *H02K 29/08* (2013.01); *H02K 2203/09* (2013.01); *H02K 2203/12* (2013.01)

(58) Field of Classification Search
USPC .............................. 310/43, 71, 194, 179–180
See application file for complete search history.

(56) References Cited

U.S. PATENT DOCUMENTS

| | | | |
|---|---|---|---|
| 5,770,902 A | 6/1998 | Batten et al. | |
| 5,932,942 A | 8/1999 | Patyk et al. | |
| 6,600,244 B2 | 7/2003 | Okazaki et al. | |
| 6,914,356 B2 | 7/2005 | Yamamura et al. | |
| 6,924,570 B2 | 8/2005 | De Filippis et al. | |
| 6,949,848 B2 | 9/2005 | Yamada et al. | |
| 7,045,920 B2 | 5/2006 | Ohuchi et al. | |
| 7,196,443 B2 | 3/2007 | Kimura et al. | |
| 7,262,529 B2 | 8/2007 | Klappenbach et al. | |
| 7,309,936 B2 | 12/2007 | Utsumi et al. | |
| 7,374,462 B2 * | 5/2008 | Kobayashi | H02K 3/522 310/71 |
| 7,402,925 B2 | 7/2008 | Best et al. | |
| 7,498,702 B2 | 3/2009 | Migita et al. | |
| 7,518,853 B2 | 4/2009 | Kato et al. | |
| 7,595,572 B2 | 9/2009 | Haga et al. | |
| 7,692,356 B2 | 4/2010 | Bott et al. | |
| 7,723,878 B2 | 5/2010 | Yagai et al. | |
| 8,035,263 B2 | 10/2011 | Kienzler et al. | |
| 8,102,093 B2 | 1/2012 | Prudham | |
| 8,339,001 B2 | 12/2012 | Ghodsi-Khameneh et al. | |
| 8,890,380 B2 | 11/2014 | Andrieux et al. | |
| 2003/0173842 A1 * | 9/2003 | Kobayashi | H02K 15/0056 310/71 |
| 2004/0066103 A1 | 4/2004 | Ohuchi et al. | |
| 2004/0256941 A1 * | 12/2004 | Yoneda | H02K 3/18 310/179 |
| 2006/0232143 A1 | 10/2006 | Purvines et al. | |
| 2007/0170792 A1 | 7/2007 | Bott et al. | |
| 2007/0188030 A1 * | 8/2007 | Drubel | H02K 3/505 310/71 |
| 2007/0278875 A1 | 12/2007 | Haga et al. | |
| 2009/0256439 A1 * | 10/2009 | Inoue | H02K 3/522 310/71 |
| 2011/0057524 A1 * | 3/2011 | Andrieux | H02K 3/522 310/71 |
| 2011/0175471 A1 * | 7/2011 | Marchitto | H02K 3/521 310/71 |
| 2012/0126646 A1 * | 5/2012 | Nakagawa | H02K 3/522 310/71 |

* cited by examiner

ELECTRICAL CONNECTION ASSEMBLY FOR BRUSHLESS MOTOR AND SYSTEM COMPRISING SUCH AN ASSEMBLY

CROSS-REFERENCE TO RELATED APPLICATIONS

This application is a National Phase Entry of International Application No. PCT/FR2013/051971, filed on Aug. 27, 2013, which claims priority to French Patent Application Serial No. 1259035, filed on Sep. 26, 2012, both of which are incorporated by reference herein.

FIELD OF THE INVENTION

The present invention relates to the field of brushless electromagnetic motors, and more especially means for electrically connecting such motors. The invention more particularly aims at motors having a very compact thickness, i.e. when the diameter to height ratio must be optimized (typically a section of less than 50 mm). Brushless electromagnetic motors are provided with assemblies of electric excitation coils generally so configured as to provide a polyphase supply. In the case of three-phase motors, three coils 3X are thus to be connected, if X is the number of coils per phase, and connected in series or in parallel, with a star or a triangle configuration.

BACKGROUND

Solutions are known in the prior art, on the one hand to connect the coils together and on the other hand to provide the 3 connections required for supplying the 3 phases. For example, the patent EP1677404 discloses a small-sized motor for electric power steering, wherein the field coil flange can be easily executed while saving space. Multiphase stator coils mounted in a stator core are connected per phase by connecting rings with the coil ends of the stator coils. A bus bar BB supplied with electric power from the outside is stacked on the connecting rings CR in the axial direction of the motor and is electrically connected to the connecting rings CR.

This document of the prior art does not disclose a coil body having two connection slots. It has no coplanar output track making it possible to obtain the simple and direct connection with the coils. As mentioned in paragraph [0102] of this document, it can be noted that a "bus bar" is provided, which is connected to the "connecting rings" which are, in turn, connected to the coils carried by bodies (which appear as not referenced in DI but which are clearly visible).

The present invention relates to a connector technology solution wherein the output tracks are directly connected to the coils through the coil body and such tracks are indexed relative to said bodies. This document thus provides a solution that uses at least one more part. The coil body is not used in the prior art since "connecting rings" are used for hooking the coil connections.

U.S. patent application publication no. 2007/278875 discloses a connection system consisting of a coil, a coil body, a first "conductor plate" and a second "conductor plate" which acts as the output. A large number of parts are thus required. In addition, the end of the output track is not folded back so as to provide an axial connection since the wire axially goes out so as to achieve a perpendicular connection (refer to FIG. 2 in D2, to the elements 24b which clamp the wire shown as axially going out). This document goes against the notions of flatness and simplicity that are aimed at by the present invention.

The patent DE20200900415 is not relevant either: as can be seen in FIG. 6 in D3, an "insulating ring" 42, used as a coil which receives the "bus bar" 44, 46, 48 is provided. The coil wires are then hooked to the "hook" 92W, 94W as shown in FIG. 1.

Therefore, no coil body having the shape of a slot complementary to that of the output track is present. No coplanar output is mentioned as having to be provided for, either, in this document. The proposed solution does not provide the advantages of a simplified connector technology and a limited number of parts.

As regards the document EP1727261, it can clearly be seen in the FIGS. 4, 7, 17 that the output tracks are not coplanar. This is the first noticeable difference. Then, when examining FIG. 6 more thoroughly, it can be seen (and read in paragraph [0020]) that the coil bodies (the "insulation ends" 10) have a "receiving chamber" 38 intended to receive the Insulation Displacement Contact 40 which is thus the part used to strip the wire. The output connector technology is provided axially by the "terminal contact" 50 that comes in the "bridge-like" portion 16a.

The reverse is true in the present document, since the wire is not bare in the coil bodies, but the output track achieves the stripping of the wire through its integrated terminal end of the IDC type. (Refer more particularly to FIG. 1 of our application, with the self-baring terminal ends 13 to 16). The elements of our claim thus cannot be found in D4 and the aims of simplicity and co-planarity are not aimed at.

U.S. Pat. No. 6,914,356 describes a solution for connecting tracks when several wires are provided. It may seem that we are straying from the object of the present invention. No coil body having a complementary shape wherein the output tracks are positioned is mentioned. No coplanar output either.

The patent WO03/001647 provides a set of coplanar tracks (although the output is axial) but the notion of slot in the body coil with a direct connection is not present. The notion of "the shape of said folded back end 15 13a, 14a, 15a, 16a being complementary to the shape of the connection slot 78" is not mentioned.

One drawback of the solutions of the prior art is their large sizes, especially in the axial direction, which does not make it possible to produce ultra-thin type engines of the "cake" type and more generally which increases the volume occupied by the motor. When the overall dimensions are limited by a restricted available space, the space occupied by the connector reduces the volume available for the rotor and the stator, and the power and the electromechanical qualities of the motor or the actuator are thus affected.

SUMMARY

The present invention aims at solving the above-mentioned problems by providing an advantageous connector engineering solution making it possible to bring the three electric phases of a motor with X coils per phase, connected in series or in parallel and delta- or star-connected to a connector having three terminal lugs, with a limited number of parts and small overall dimensions, both axially and transversally. For this purpose, the invention, according to its broadest sense, comprises, on the one hand, a brushless electric motor, and on the other hand a complementary connection assembly, with said brushless electromagnetic motor comprising a coiled stator assembly with P electric phases and X coils per phase, with each coil being carried by a body provided with two connection slots, characterized in that said connection assembly consisting of a first sub-assembly formed of W tracks cut in a conductive sheet, with said tracks forming W coplanar output tracks, with W being an integer between P and P+I, with each one of said W tracks terminating in at least one end folded back perpendicularly to the plane of said tracks, with the shape of said folded back end being complementary to the shape of the slot connection, with said tracks being joined by an insulating plastic material.

An electrical connection assembly for a brushless electromagnetic motor comprising a coiled stator assembly with P electric phases and X coils per phase, with each coil being carried by a body provided with two connection slots, characterized in that it consists of a first sub-assembly formed of W tracks cut in a conductive sheet, with said tracks forming W coplanar output tracks, with W being an integer between P and P+I, with each one of said W tracks terminating in at least at one end folded back perpendicularly to the plane of said tracks, with the shape of said folded back end being complementary to the shape of the connection slot, with said tracks being joined by an insulating plastic material. Advantageously, said tracks are initially connected by connecting bridges and then separated by cutting the connecting bridges upon overmolding with an insulating plastic material and are held by such overmolding. Still advantageously, the body is provided with slots which are used as supports for the coils whereon they are wound.

The invention also aims at providing a solution for connecting an assembly of Y signals (such as those emitted by Hall probes from an encoder used for detecting the rotor position of said motor from a printed circuit to same connector. For this purpose, the encoder is advantageously in the form of at least one circular magnetic track connected to the rotor and having alternating north-south magnetic poles associated with at least two Hall sensors positioned on a printed circuit in the axially adjacent direct vicinity of the magnetic track and detecting the evolution of the magnetic induction generated by the magnetic track. The electric management (supply and reading of signals) of the Hall probes is provided by an assembly of Y plugs which extend from the printed circuit and laterally go out of the motor toward a connector.

According to this particular embodiment, the connection assembly according to the invention further comprises a sub-assembly of connection tracks for connection to at least one position sensor. Advantageously, recesses are provided on the outer tracks to enable an optimized cutting in only one metal sheet. According to a particular embodiment, the tabs associated with the sensor have curved inner tracks. In a preferred implementation, said sub-assembly of tracks for the connection to at least one position sensor is co-molded upon molding the coil connecting tracks.

The invention also relates to a stator structure comprising a coiled stator assembly with P electric phases and X coils per phase, with each coil being carried by a body provided with two connection slots, and an electrical connection assembly according to the foregoing. Advantageously, said connector assembly is directly connected to said stator assembly. According to a particular embodiment, the surfaces of the connection slots perpendicular to the direction of insertion of the folded back end have pockets being complementary to the protrusions present on the overmolding, surrounding the corresponding folded back end. Said slots preferably have a configuration able to ensure a pre-centering upon the engagement of the folded back end into said connection slot. According to a particular embodiment, said configuration is able to ensure a pre-centering and consists of a chamfered bore.

BRIEF DESCRIPTION OF THE DRAWINGS

The invention will be better understood when reading the following description while referring to the appended drawings wherein.

DETAILED DESCRIPTION

Figures 1, 2:
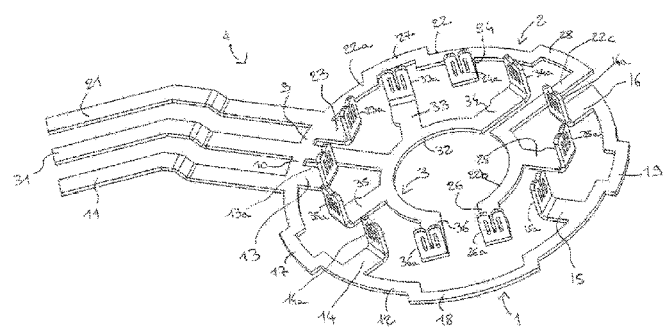
FIG. 1 shows a first sub-assembly for connecting the coils, to form a connector according to the present invention.
FIG. 2 shows a second sub-assembly for connecting the sensors, to form a connector according to the present invention.

FIG. 1 shows the first connection sub-assembly 4 for producing a connector engineering assembly as claimed by the present patent. Such FIG. 1 and the description thereof relates to a method of connection of the "triangle" type intended for an assembly of 6 electric coils forming three electric phases through the parallel connection of the coils two by two. The description of the connection sub-assembly 4 which is given below thus precisely refers to this "triangle/parallel" connection but the persons skilled in the art will be able to adapt the teachings below to any type of well-known connection (triangle or star and serial or parallel connection of the coils as described for example in patent FR2923951) without departing from the scope of the invention.

The first sub-assembly 4 is formed by three tracks 1 to 3 cut in a sheet of conductive, preferably non-magnetic, material such as brass, for example a copper-zinc alloy of the CuZn30 type which consists of 70% copper and 30% zinc. The cutting may be obtained by stamping, using a pure or silica-filled water jet, a laser or any other technique known to the persons skilled in the art.

The three tracks 1 to 3 are essentially coplanar (possibly except for the connection extensions 11, 21, 31), and have connection extensions parallel to each other 11, 21, 31 and extending parallel to an middle connection extension 31. Such connection extensions 11, 21, 31 constitute the connection lugs making it possible to establish an electrical contact with a connector for supplying the coils (not shown here). Each track 1 to 3 is connected with four coils to form, two by two, one phase of power supply, according to a configuration known in the prior art.

The first track 1 has a curved portion 12 extending over about 220°, ending in a connecting extension 11. The inner part of the curved portion 12 is extended by four radial shoes 13 to 16 directed towards the center of curvature of the curved portion 12. Each one of such radial shoes 13 to 16 terminates in a self-baring end folded back over 90° 13a to 16a enabling the connection to the coils wires through a connection of the self-baring (or IDC, for Insulation Displacement Contact) type. The angular positioning of such radial shoes 13 to 16 and the corresponding folded back ends 13a to 16a is determined according to the position of the wires connecting the stator coils.

The curved portion 12 has a substantially constant radial thickness. However, it is provided with recesses 17 to 19 to enable cutting the three tracks 1, 2, 3 in a single sheet while reducing the waste of material. The depth of such recesses 17 to 19 and the angular extension thereof is so determined as to enable the cutting of the radial expansions of the complementary tracks 2, 3.

The second track 2 has a curved portion 22 extending over about 220°, terminating in a connection extension 21. The curved portion 22 is extended by four radial shoes 23 to 26 directed towards the center of curvature of the curved portion 22. The curved portion 22 is arranged substantially symmetrically to the first curved portion 12 with respect to a central axis going through the central connection extension 31.

Each one of such radial shoes 23-26 terminates in a self-baring end folded back over 90° 23a to 26a enabling the connection to the coils wires through a connection of the self-baring (or IDC, for Insulation Displacement Contact) type. Each end has a central plane perpendicular to a radial axis going through the center of the shoe.

The curved portion 22 has a first segment 22a having the same radius as the curved portion 12 of the first track 1. Such first segment 22a extends over about 120° and then extends in a second segment 22b extending over about 100°, with a smaller radius. The two segments 22a, 22b are connected by a radial segment 22c.

The curved portion 22 has a substantially constant radial thickness. However, it is provided with recesses 27, 28 to enable the cutting of the three tracks in one single sheet while reducing the waste of material. The depth of such recesses 27, 28 and the angular extension thereof are so determined as to enable the cutting of the radial shoes of the complementary tracks 2, 3.

The third track 3 has a curved portion 32 extending over about 220°, terminating in a connection extension 31. The curved portion 32 has a radius substantially identical to the radius of the second segment 22b of the second track 2. The curved portion 32 is extended by four radial shoes 33 to 36 oriented in a direction opposite the center of curvature of the curved portion 32.

Each one of such radial shoes 33-36 terminates in a self-baring end folded back over 90° 33a to 36a enabling the connection to the coils wires through a connection of the self-baring (or IDC, for Insulation Displacement Contact) type. The tracks are thus cut in one single sheet as demonstrated by the bridges 9, 10 shown in this Figure but which are cut after completion of the sub-assembly 4 to isolate the tracks from one another.

FIG. 2 shows a second sub-assembly 40 for the connection of a position encoder, for example implementing Hall probes. It consists of a converging bundle of five connecting tracks 41 to 45 supported by two insulating plates 46, 47. Such tracks 41 to 45 are intended to be connected to an external circuit managing the supply and reading of the signals transmitted over such tracks 41 to 45, namely the signals of the position encoder, e.g. as Hall probes. For example, with three Hall sensors, the five tracks 41 to 45 enable the connection to a (common) ground, a (common) power supply and three sensor signals (i.e. five connections are thus required indeed). The end of each track 41 to 45 extends perpendicularly to connecting means, for example to one end 51 to 55 having a "needle eye" of the Press-Fit (trade name) type.

Figure 3:
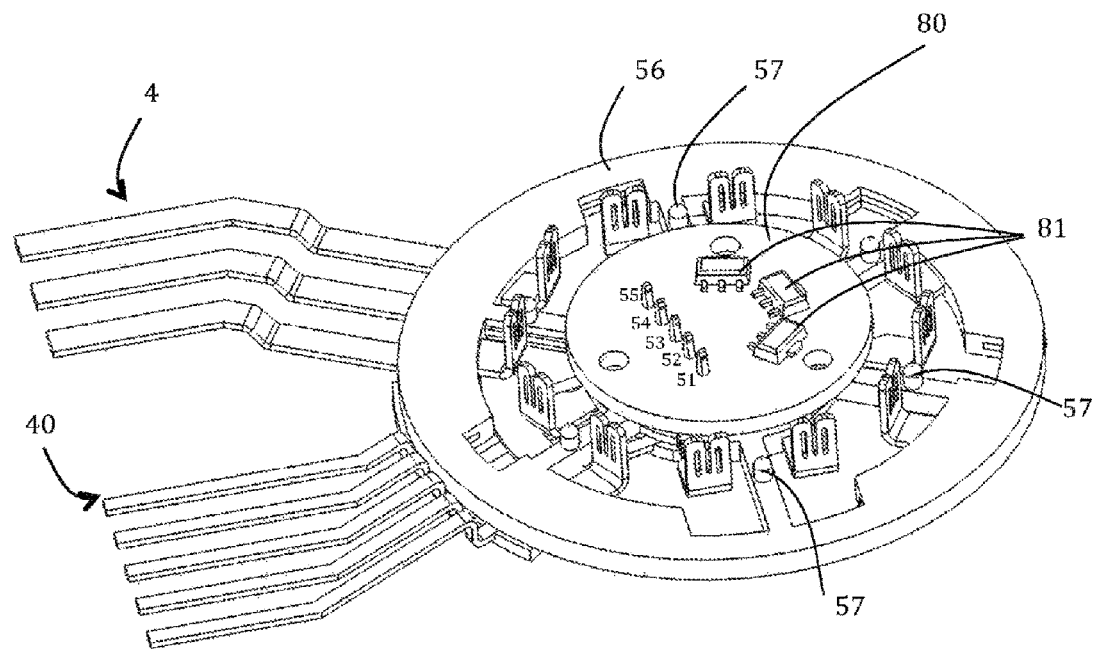
FIG. 3 shows a connector according to the present invention.

Both assemblies 4, 40 are overmolded to form a connector enabling to provide both the mechanical and electrical connections, through a system shown in FIG. 3. The overmolding 56 holds the two subassemblies 4, 40 together. One of the objects of the invention is also to make it possible to enable a different angular indexing of the two sub-assemblies 4, 40 according to the relative position of the output connectors—not shown—(for supplying the coils on the one hand and managing the Hall probes on the other hand). The overmolding 56 has protrusions 57 having a non limiting shape of a pin, intended to enable the indexing of the overmolded assembly on the coiled stator 60.

The inner end of the second sub-assembly 40 is made integral with a printed circuit board 80 by means of a Press-fit fixing or by welding the ends 51 to 56. The printed circuit 80 additionally carries the Hall sensors 81 intended to detect the position of the motor rotor (not shown).

Figure 4:
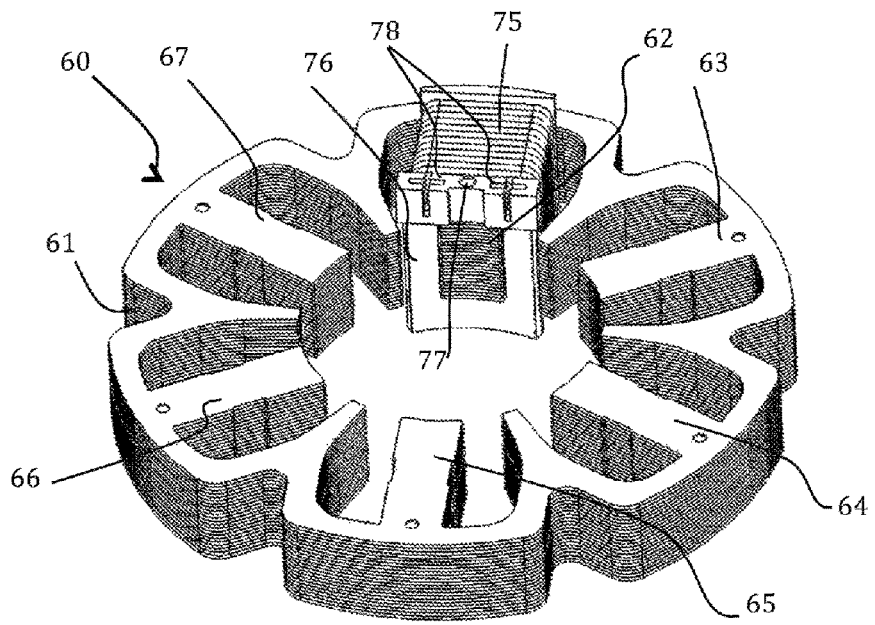
FIG. 4 shows a separate view of the stator assembly with a single coil.

The stator 60 shown in FIG. 4 consists of a stack of soft iron plates 61 having six wide radial teeth 62 to 67 intended to receive electric coils. Only one coil 62a is shown here for clarity. The stator 60 also has intermediate teeth 68 to 73 which are narrower than the wide teeth 62 to 67. All the teeth extend radially from a peripheral ring 74. Such stator 60 is consistent with the one disclosed in the patent FR2899396 but in no way limits the scope of the present invention which is globally intended to enable the connection of all types of topologies of brushless motors, the teeth of which extend radially.

Each wide tooth 62 to 67 carries a coil 75 which is positioned on a coil body 76. Such coil bodies 76 have, on the one hand, pockets 77 intended to enable the indexing of the sub-assemblies 4, 40 overmolded on the coiled stator 60 and, on the other hand, slots 78 intended to enable the electrical connection. The terminal end of an insulated electric wire, which will be connected through the self-baring folded back ends of the tracks 1, 2, 3, is positioned in these slots 78. These slots have insertion pockets opening in substantially rectangular cavities having two longitudinal large faces parallel to a central longitudinal plane. Such longitudinal central plane and the two large faces are perpendicular to a radial axis.

The pockets 77 may have various shapes and locations on the coil bodies 76 but must be complementary in shape with the protrusions 57 present on the overmolding 56. Advantageously, the pockets 77 may be chamfered to accommodate a tolerance in the mounting of the overmolding 56 on the coil bodies 76.

Figure 5:
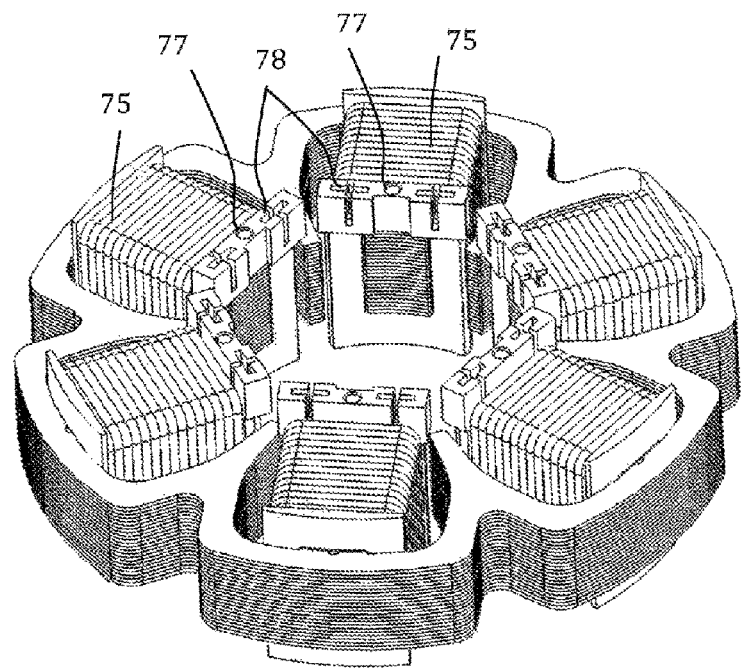
FIG. 5 shows a separate view of the complete coiled stator assembly.
Figure 6:
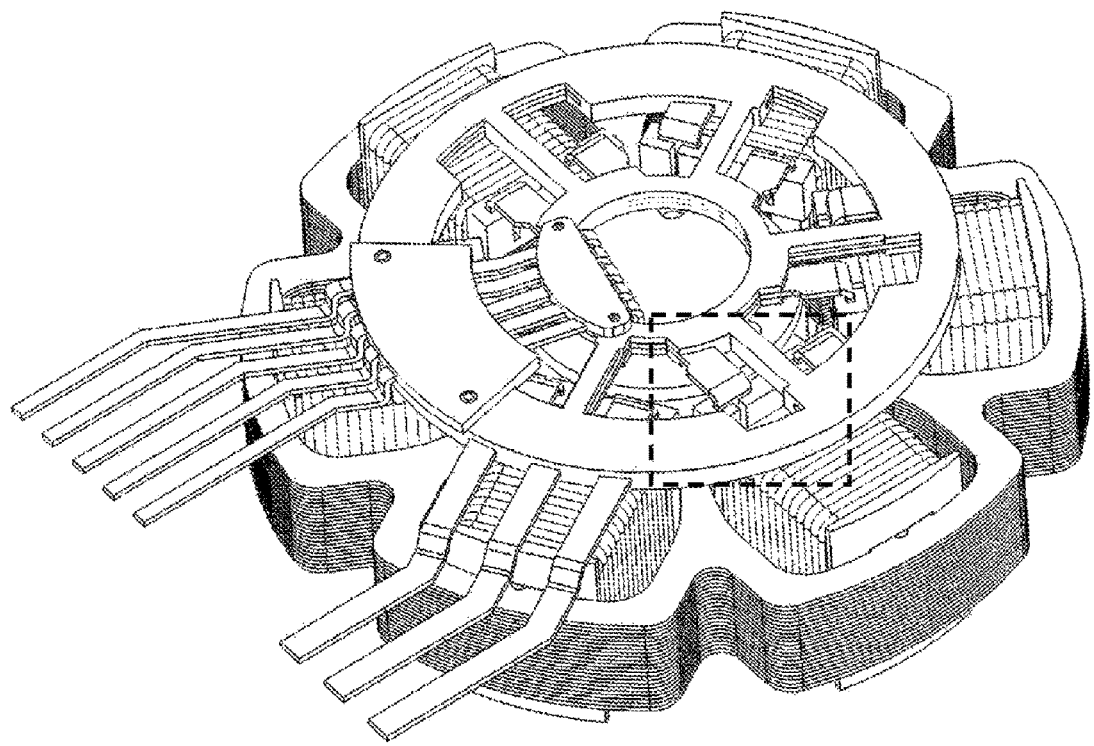
FIG. 6 shows a view of the stator and the connection assembly.

FIG. 5 shows the coiled stator assembly 60 wherein each wide tooth carries an electric coil wound around a coil body which has pockets and slots intended to receive the sub-assemblies 4, 40 for the mechanical indexing and the electrical connection. The first connection sub-assembly 4 is applied to the front face of the stator 60 to provide the mechanical connection of the assembly via the indexing of the overmolding 56 with the pockets 62c to 67c, as shown in FIG. 6. This tolerant indexing makes it possible to position the self-baring folded back ends 13a to 16a, 23a to 26a and 33a to 36a of the first sub-assembly 4 and enables the electrical connection within the slots 78 of the coil bodies 76.

Figure 7:
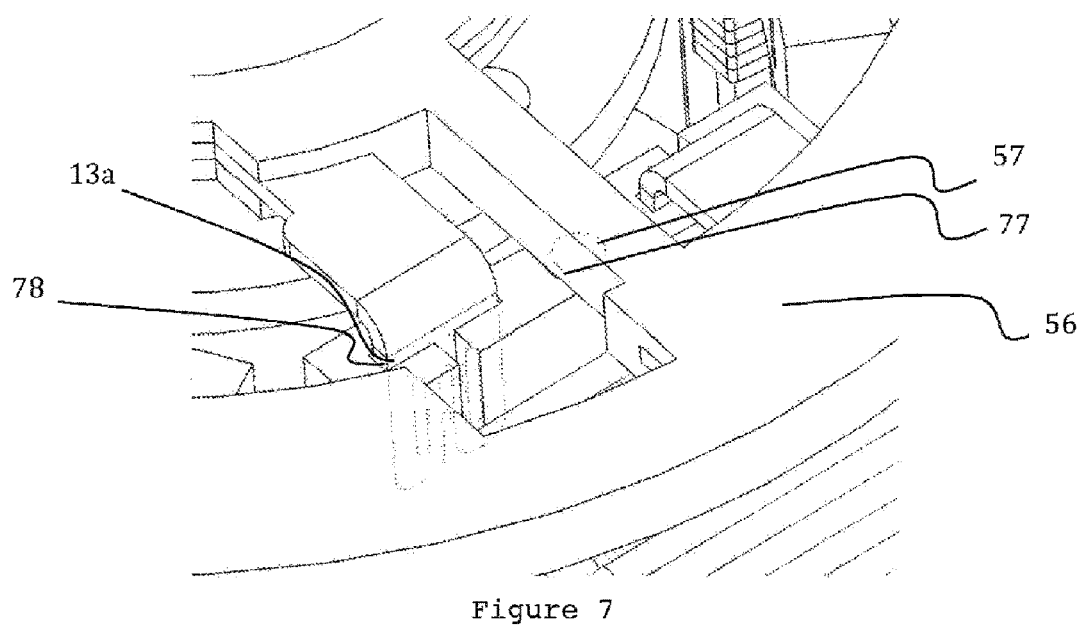
FIG. 7 shows a detail view of FIG. 6.
Figure 8:
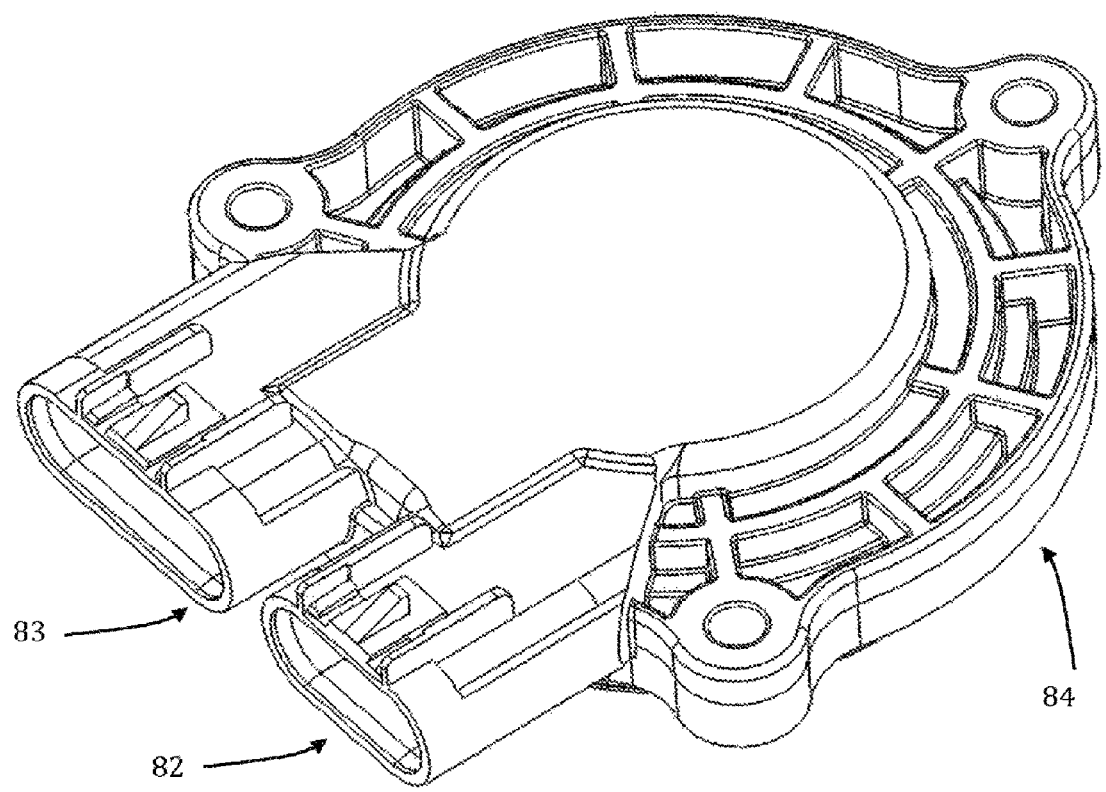
FIG. 8 shows the connection and overmolded motor assembly.

FIG. 7 shows a detail view of FIG. 7 (as per the dotted line in FIG. 6) wherein the electrical connection provided through the folded back end 13a in the slot 78 and permitted by the mechanical indexing of the overmolding 56 with the protrusion 57 which engages in the pocket 77 may be better appreciated. FIG. 8 shows the connection assembly after the overmolding 84 of the assembly wherein the two sub-assemblies 4, 40 enable the electrical connection of the coils of the motor and the position sensor through the two female connectors of the motor 82 and the sensor 83 complementary to the male connectors (not shown) in the application. The product thus formed ensures safe electrical connections using a minimum number of parts within a limited axial space.

The invention claimed is:

1. A system comprising on the one hand a brushless electric motor and on the other hand a complementary connection assembly, with said brushless electromagnetic motor comprising a coiled stator assembly with P electric phases and X coils per phase, with each coil being carried by a body provided with two connection slots, said connection assembly comprising a first sub-assembly formed of W tracks cut in a conductive sheet, with said tracks forming W coplanar output tracks, with W being an integer between P and P+I, with each one of said W tracks terminating in at least one end folded back perpendicularly to the plane of said tracks, with the shape of said folded back end being complementary to the shape of the connection slot, with said tracks being joined by an insulating plastic material.

2. An electrical connection assembly for a system according to claim 1, wherein said first sub-assembly formed of said W tracks cut in a conductive sheet, with said tracks forming W coplanar output tracks, with W being an integer between P and P+I, with each one of said W tracks terminating in at least one end folded back perpendicularly to the plane of said tracks, with the shape of said folded back end being complementary to the shape of the connection slot, with said tracks being joined together by an insulating plastic material.

3. An electrical connection assembly according to claim 2, wherein said tracks are held by the overmolding of an insulating plastic material.

4. An electrical connection assembly according to claim 2, wherein said tracks are initially connected by connecting bridges and are then separated by cutting the connecting bridges upon overmolding with an insulating plastic material.

5. An electrical connection assembly according to claim 2, wherein said body provided with said two slots is a support whereon said coil is wound.

6. An electrical connection assembly according to claim 2, further comprising a second sub-assembly of conductive tracks for connecting at least one position sensor.

7. An electrical connection assembly according to claim 2, wherein said tracks have a circular shape and in that recesses are provided on the outer tracks to enable cutting in only one sheet.

8. An electrical connection assembly according to claim 6, wherein said second sub-assembly is co-molded upon overmolding the coil connecting tracks.

9. A stator structure for a system according to claim 1, further comprising a coiled stator assembly with P electric phases and X coils per phase, with each coil being carried by a body provided with two connection slots and an electrical connection assembly.

10. A stator structure according to claim 9, wherein said connection assembly is directly connected to said stator assembly.

11. A stator structure according to claim 10, wherein an overmolding of the connecting tracks has protrusions.

12. A stator structure according to claim 11, wherein surfaces of said connection slots perpendicular to a direction of insertion of said folded back end have pockets being complementary to said protrusions of said overmolding surrounding said corresponding folded back end.

13. A stator structure according to claim 12, wherein said pockets have a configuration able to ensure a pre-centering upon engagement of said folded back end into said connection slot.

14. A stator structure according to claim 13, wherein said configuration is able to ensure a pre-centering comprising a chamfered bore.

* * * * *